(No Model.)
B. KELLOGG.
TYPE BAR HANGER FOR TYPE WRITING MACHINES.
No. 516,817.  Patented Mar. 20, 1894.
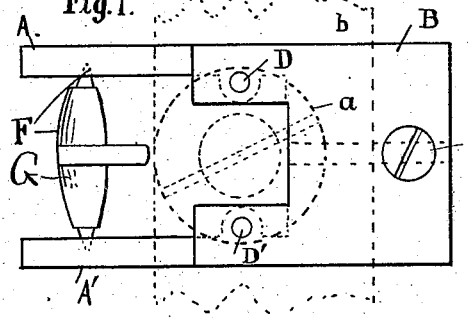
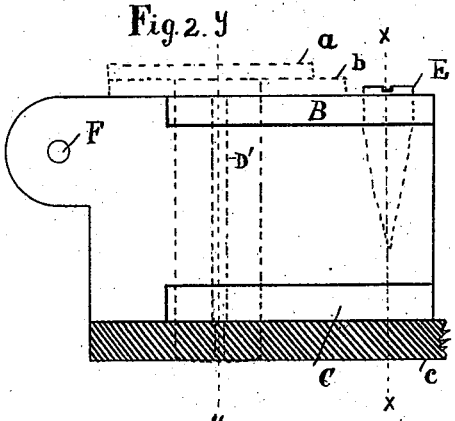
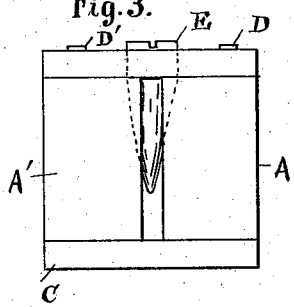
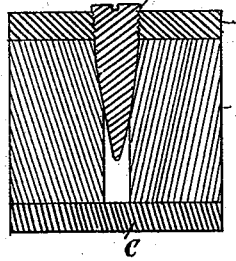
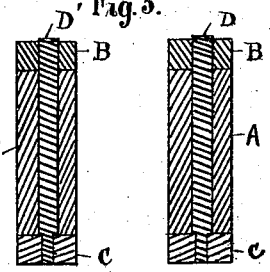
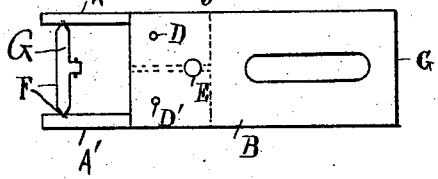
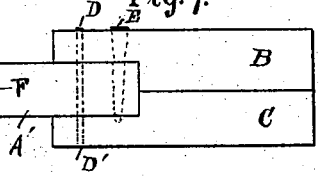
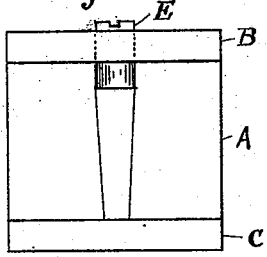
Witnesses —
L. M. Thurlow.
Arthur Keithley
Inventor.
Benjamin Kellogg

UNITED STATES PATENT OFFICE.

BENJAMIN KELLOGG, OF PEORIA, ILLINOIS.

TYPE-BAR HANGER FOR TYPE-WRITING MACHINES.

SPECIFICATION forming part of Letters Patent No. 516,817, dated March 20, 1894.

Application filed December 22, 1892. Serial No. 456,010. (No model.)

*To all whom it may concern:*

Be it known that I, BENJAMIN KELLOGG, a citizen of the United States, residing at Peoria, in the county of Peoria and State of Illinois, have invented a new and useful Type-Bar Hanger, of which the following is a specification.

My invention relates to improvements in type-bar-hangers for type writing machines, in which the sides of the same forming the bearings for the tapered journal of the type-bar, are drawn and retained against the same in proportion to the wear of the same.

The object of my invention is to produce a type-bar hanger in which the wear or "lost-motion" sustained between the said type-bar-journal and the said hanger may be "taken up" without the necessity of taking the said parts from the machine, or without necessitating expert adjustment, in order to enable a person unskilled in the art of adjusting and aligning typewriters to take up the varying wear of said parts without displacing the same or impairing the alignment; by this means increasing the durability of typewriters. I attain these objects by the devices illustrated in the accompanying drawings, in which—

Figure 1, is a plan view of the top of one of my hangers the hanger or adjusting screw (a) and hanger washer (b) retaining said hanger on disk or type-ring (c), being indicated by dotted lines. Fig. 2 is a side view of the same, showing a portion of the machine to which it is applied in section the adjusting screw and washer being omitted the adjusting or hanger screw (a) and hanger-washer (b) retaining said hanger or disk on typering (c), being indicated by dotted lines. Fig. 3, is a rear-end view of the same. Fig. 4, is a sectional view through the line $x$—$x$. Fig. 5, is a sectional view through the line $y$—$y$. Fig. 6, is a top view of a modification of the same device. Fig. 7, is a side view of the device shown in Fig. 6. Fig. 8, is an end view of a device which may be used in lieu of the device preferably shown.

In the drawings, A A' represent the respective side plates which form the bearings for the tapered journal F of the type-bar. The said plates A A' are held between the top-plate B and bottom plate C by means of the rivets D D' respectively. These said rivets form bearings on which said side-plates may oscillate. They likewise provide a means for preventing the unnecessary squeezing together of the said top and bottom plates on the said side plates, which would result in the rigidity of said plates and prevent their necessary oscillation on said rivets; this result is accomplished by making said rivets a trifle longer than is necessary to rivet, resulting in their protruding through both top and bottom plates in such a manner that the washer or hanger-screw holding the device in the machine will bear on their ends rather than on the top plate, which will permit the side-plates to oscillate on said rivets. Reference to the sectional view through the line $y$—$y$, Fig. 5, will show a still more perfect means of accomplishing this result; the rivets D D' having an offset or shoulder which rests on the bottom-plate above referred to, there can be no possibility of the said top and bottom plates being pressed rigidly together in fastening the hanger in the machine. The said side plates A A' have tapered holes F at one extremity to correspond with the taper of the type-bar journal G, which is thus held suspended between them. At their other extremity, a tapered screw E, passing in and through the top plate heretofore mentioned equidistant from the rivets D D', pressing against their inner sides forces them apart equally, and by means of their oscillation on the rivets D D', draws them with equal force against the said tapered journal of the type-bar, thus preventing disalignment and taking up all lost motion.

In Fig. 6 is shown a modification of the same substantial device, in which the top and bottom plates are extended and recessed to hold the side-plates, having a slot G through which the hanger screw is to pass and hold the device in the machine. The object is to provide a longer and narrower hanger for some special machines and more particularly to dispense with shoulder on said rivets, thereby simplifying and cheapening the cost of construction. It will be further noted, that while in the drawings the hanger shown in Fig. 6 consists of separate top and bottom pieces, the same result may be attained by "milling" the recess for the reception of said side plates, from a solid piece of metal, thereby further cheapening and simplifying the device.

In Fig. 8 is shown a modification of the device, in which a square screw is used pressing between tapered side plates. This is considered a mechanical equivalent, and in other respects the device is the same.

In operation, the said hanger having been placed in the machine, and it being desired to readjust the hanger, for wear or otherwise, without removing the hanger-screw holding the device in the machine, or otherwise disturbing it, the screw controlling the adjustment for tightness or looseness, E, is either tightened or loosened as desired, with a like result on the side-plates A A' and the journal G, without in anywise effecting the alignment of the letter on said type-bar.

Having thus described my invention, what I claim, and desire to secure by Letters Patent, is—

1. An adjustable typewriter typebar hanger, having the side plates A A', pivotally retained between the top and bottom plates B C, respectively, by the rivets D D', respectively, said rivets extending slightly through said top and bottom plates and having a shoulder offset resting on the bottom plate near their lower extremity; the top-plate B; the bottom-plate C; the shouldered rivets D D'; and the taper-pointed adjusting screw E, equidistant from the rivets D D', screwed into the top-plate B and forcing the ends of the side-plates A A' outwardly upon the rivets D D' respectively as axes or fulcrums as and for the purposes hereinbefore set forth.

2. A typewriter-typebar-hanger, having the top and bottom plates B C respectively and the rivets D D' retaining pivotally the side plates A A'; said side plates provided with tapered holes to correspond with the taper of the type-bar journal and engaging with the same at one extremity and retaining said type-bar-journal suspended between them; the said top plate having a threaded hole near its extremity farthest from said type-bar into which is screwed a tapered-pointed screw, said screw passing between the said side plates and forcing them apart on the rivets D D' and against the taper of said type-bar, as and for the purposes hereinbefore set forth.

3. An adjustable typewriter typebar-hanger, having the top and bottom plates B C, having the slot G, and having at its inner extremity, a recess for the side plates A A', rivet holes D D' and the threaded hole E; the side plates A A' tapered toward the under side thereof, leaving a wedge-shaped recess between them; the rivets D D'; and the square pointed screw E in engagement with the tapered sides of the side-plates, and equidistant from rivets D D', as and for the purposes hereinbefore set forth.

BENJAMIN KELLOGG.

Witnesses:
RICHARD ALLEN KELLOGG,
SARAH J. KELLOGG.